Figure 1:
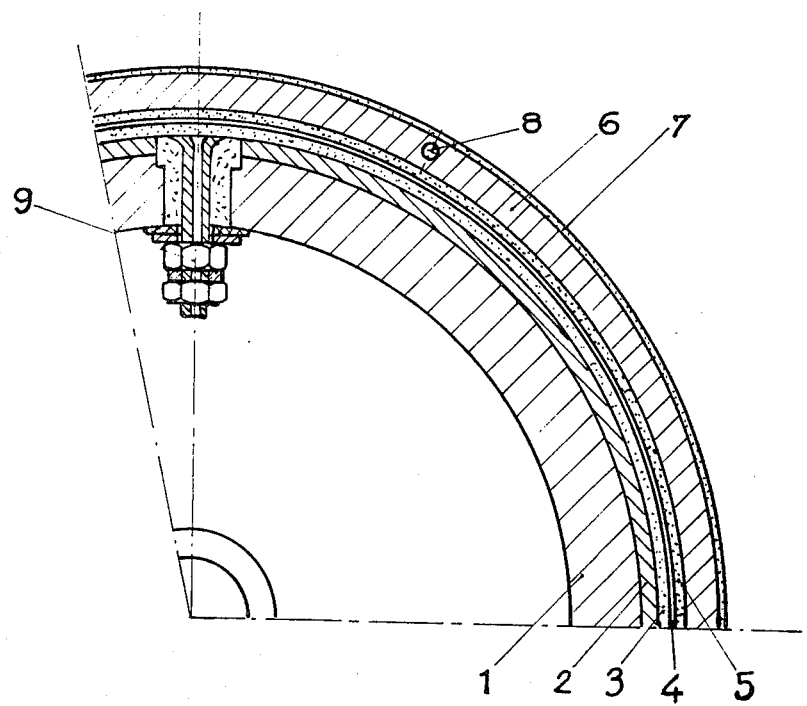

United States Patent [19]
Isoard

[11] 3,968,347
[45] July 6, 1976

[54] MONOLITIC HEATING STATOR FOR THERMALLY TREATING ROLLERS

[75] Inventor: Bernard Isoard, Ecully, France

[73] Assignee: Rhone-Poulenc-Textile, Paris, France

[22] Filed: Feb. 7, 1975

[21] Appl. No.: 547,944

[30] Foreign Application Priority Data
Feb. 28, 1974 France .............................. 74.07175

[52] U.S. Cl. ................................ 219/530; 219/469; 219/523; 219/544
[51] Int. Cl.² .......................................... H05B 3/50
[58] Field of Search ........... 219/388, 469, 470, 471, 219/523, 530, 534, 540, 544, 552; 338/308; 29/130

[56] References Cited
UNITED STATES PATENTS

| | | | |
|---|---|---|---|
| 415,856 | 11/1889 | Carpenter | 219/469 |
| 2,526,906 | 10/1950 | Schaal et al. | 219/469 |
| 3,239,652 | 3/1966 | Price | 219/469 |
| 3,278,723 | 10/1966 | Van Toorn | 219/470 |
| 3,326,720 | 6/1967 | Bruhl, Jr. et al. | 338/308 X |
| 3,401,439 | 9/1968 | Staats et al. | 29/130 |
| 3,471,683 | 10/1969 | Bogue | 219/469 |
| 3,825,725 | 7/1974 | Leitner et al. | 219/530 |
| 3,857,015 | 12/1974 | Clark et al. | 219/244 |

*Primary Examiner*—Volodymyr Y. Mayewsky
*Attorney, Agent, or Firm*—Stevens, Davis, Miller & Mosher

[57] ABSTRACT

This document discloses a stator member for rollers used in the thermal treatment of elongated materials such as filaments, yarns, slivers, rovings, etc. The structure comprises a metal support, an electric insulating spray on the support, a resistor, another layer of electrical insulator spray to cover the first coating and embedded therein and a spray on layer to construct a friction surface.

10 Claims, 1 Drawing Figure

MONOLITIC HEATING STATOR FOR THERMALLY TREATING ROLLERS

This invention relates to a thermal treatment device for a roller used, for example, for the thermal treatment of elongated material such as continuous filaments, yarns, slivers, rovings, etc., such as are described in French Patent No. 1,574,025.

According to said patent, the roller comprises a hollow rotor, the periphery of which is, during use, in contact with the material to be thermally treated. A stator is disposed inside the rotor and is provided with a heating or cooling element. Between the rotor and stator there is a conductive body composed at least partly of a lubricating and heat conducting solid material in contact with the rotor and the stator. The connecting body is advantageously made from a sintered material impregnated with a lubricant; its role is to support the rotor and to transmit the thermal flow designed for raising the rotor temperature up to a predetermined temperature and for maintaining said predetermined temperature. Usually, it is made in the form of a ring. Thus, heating or cooling bearings made from a mechanical assembly (stator + autolubricating ring) may be obtained. But another embodiment exists according to which the intermediate connecting body is at least a part of the stator periphery. In this case, the heating element, usually an elecricalresistance, and the connecting element, form one block acting as a heating bearing.

The main problems encountered in making such bearings are: electrical insulation of the resistance, the transmission of the thermal flow from the resistance towards the external periphery of the bearing, the coefficients of expansion of the various materials from which the bearing is made and the thermal insulation of the inside of the bearing when heat transmission in this direction is to be reduced.

It is an object of the invention to provide a solution to the above mentioned problems. It involves a heating bearing with monolithic structure characterized by the fact that it is made from a combination of the following elements:

a cylindrical metallic, advantageously steel, support a first layer of a mineral electrical insulator, sprayed on the support by a chemical flame or plasma torch an electrical resistance coiled round said first layer of mineral electrical insulator a second layer of a mineral electrical insulator, sprayed on the first layer by a chemical flame or plasma torch and in which the electrical resistance is embedded a friction layer, sprayed on the second layer of mineral electrical insulator by a chemical flame or plasma torch The mineral electrical insulator is made from materials such as aluminium oxide (alumina), zirconium oxide, magnesium aluminate (spinel), silicate, for example, aluminium silicate (mullite), etc. Advantageously, alumina is used. Each layer of mineral electrical insulator is advantageously 0.2 to 2 mm thick.

The friction layer is made from materials such as bronze, molybdenum, chromium oxide. It is advantageously 0.05 to 0.5 mm thick.

In addition, the heating bearing may comprise:

a cermet layer between the second layer of mineral electrical insulator and the friction layer, sprayed by chemical flame or plasma torch. Cermet is a pseudo alloy of a metal and of a fireproof compound such as metallic oxide, boride, nitride, etc. The thickness of this layer has no technical higher limit; it varies according to needs. For instance, it may be provided for housing a temperature detecting sensor. In addition, by using a support of given diameter, covered with material layers more or less thick, it makes it possible to give the desired dimension to the outside diameter of the heating bearing. The cermet used exhibits a good thermal conductivity and a coefficient of expansion as near as possible that of the material from which the support is made.

Between the metallic support and the first layer of mineral electrical insulator, it is possible to dispose a layer of thermal insulator such as zirconia (zirconium oxide) or soda zirconate, sprayed by chemical flame or plasma torch, in order to avoid the thermal diffusion inside the metallic support. Advantageously, it may be several millimeters thick. Advantageously, the metallic support exhibits a linear section in the form of a ring; it may be made from steel. It carries electrical connections for the resistance branching.

The first layer of mineral electrical insulator, advantageously alumina, aims to the electrical insulation of the metallic support from the resistance. Its minimal thickness is determined by its insulating properties whereas its maximal thickness is only limited by dilatation problems and from the economical point of view, by the cost price. Advantageously, thickness is comprised between 0.2 and 2 mm. The electrical resistance may consist of a ribbon made from a nickel-chromium alloy, helix-coiled round the first layer of mineral electrical insulator. As it is known, the helix pitch may vary in order to provide different heating zones along the roller.

The second layer of mineral electrical insulator (for example, alumina), is also designed for the resistance electrical insulation. Its thickness is advantageously comprised between 0.2 and 2 mm. Its action as a thermal insulator is reduced on account of its low thickness. Thereby, its impediment to the thermal transmission is negligible. Though the coefficients of expansion of alumina and steel are different, during heating the alumina layer, on account of its low thickness, "follows" the steel support dilatation without detachment of said layer, if suitable the precautions are taken to insure a good bonding between the successive layers (surface preparation).

The cermet layer supports the rotor, through the friction layer and transmits the thermal flow from the resistance to it. Cermet is made from materials in proportions such that its coefficient of expansion is near that of the material from which the support is made. This precaution is made necessary by the possible great cermet layer thickness. Besides, it offers a good thermal conductivity. Advantageously, with a steel support, an aluminium and alumina cermet will be used in the average proportions of 25 percent aluminium, 75 percent alumina, particularly on account of its low price. But other types of cermet, particularly made from metal and oxide, may be used, for example: aluminium oxide and nickel or chromium, zirconium oxide and chromium, aluminium oxide and molybdenum, etc. Given as an example, the thermal conductivity at 200°C of the different materials from which the bearing according to the invention is made, is as follows:

| | | |
|---|---|---|
| alumina | about | 9 Kcal/h.m.°C |
| zirconium | about | 0.8 Kcal/h.m.°C |
| steels | about | 40 Kcal/h.m.°C |
| aluminium | about | 170 Kcal/h.m.°C |
| bronze | about | 160 Kcal/h.m.°C |

The thermal conductivity of the finished bearing made from cermet + alumina is about 50 Kcal/h.m.°C.

The coeffficient of expansion of the different materials from which the bearing is made, at 50°–200°C, is as follows:

| | |
|---|---|
| zirconium | 7 to 9 × $10^{-6}$ |
| alumina | 4 to 5 × $10^{-6}$ |
| aluminium | 23 to 25 × $10^{-6}$ |
| steels | 12 to 15 × $10^{-6}$ |

For comparison, a complex consisting of 1.5 mm zirconium, 0.5 mm alumina, 2.5 mm cermet (aluminium 25 percent, alumina 75 percent), from which the bearing is made, has a coefficient of expansion of 14.2 × $10^{-6}$, comparable with that of steels. A complex consisting of 1 mm zirconium, 2.5 mm cermet (aluminium 25 percent, alumina 75 percent) has a dilatation coefficient of 14.5 × $10^{-6}$.

Cermet also offers a good thermal impact strength. Advantageously, a housing is provided in the cermet layer thickness for a thermoresistant sensing element or other designed for the rotor temperature detection and regulation. Said housing preferably consists of a metallic tube of small diameter, embedded at the time of spraying.

In order to confer insulating properties (moisture absorption), the cermet can be impregnated hot and under vacuum with a lubricating liquid such as a mineral oil resistant to the operating temperature, or with a lubricating silicone.

When the cermet layer is covered with a bronze friction layer, this can also be impregnated with a lubricating liquid. The periphery of the bearing in contact with the rotor is machined according to the required mechanical tolerances and its surface exhibits a minimum friction coefficient.

The different layers from which the bearing is made are sprayed by means of chemical flame or plasma torch. These different layers can be bonded by thin, for example, 0.05 mm thick, bonding layers in association with a surface state of determined roughness. Bonding layers are made from materials such as nickel aluminide, molybdenum, etc.

Heating bearings from the invention with monolithic structure exhibit the same thermal and friction characteristics as bearings realized by mechanical assembling of parts. But they also offer advantages. On account of their monobloc structure, their mounting in the roller is facilitated. Since the coefficient of expansion is nearly the same (slightly lower) as that of steel from which the bell (rotor) is made, the clearance between bearing and rotor remains practically constant. Thus, it is possible to process at very different temperatures with the same device. They can be machined as any mechanical part with very precise tolerances. They are very strongly built, and their life is very long since the embedded electrical resistance is completely sheltered from air.

The following example is given for information but is not restrictive.

FIG. 1 illustrates a quarter-section of a heating bearing according to the invention.

EXAMPLE

The heating bearing consists of a steel tubular bearing body 1, 81 mm in outside diameter. It is covered successively with the following materials or elements:

a zirconium layer 2, 2 mm thick, acting as a thermal insulator towards the bearing inside, a first alumina layer 3, 0.5 mm thick, acting as an electrical insulator for the resistance, a resistance 4, consisting of a nickel-chromium alloy ribbon 1 × 0.3 mm coiled round the layer 3, a second alumina layer 5, 0.9 mm thick, covering the layer 3 and embedding the resistance 4, this layer acting as an electrical insulating layer for the resistance, a cermet layer 6, 2.8 mm thick, made from 75 percent alumina, 25 percent aluminium; a tube 1.8 mm diameter being placed inside this layer as housing 8 for a temperature sensing element; this layer also ensures the thermal connection between the heating resistance and said rotor, a bronze layer 7, 0.3 mm thick, impregnated with an hydrophobic lubricant, resistant to high temperatures and exhibiting good dielectric characteristics, such as a silicone lubricant.

Zirconium, alumina, cermet and bronze are sprayed by chemical flame or plasma torch.

Between the cermet 6 and bronze 7 layers, a (not shown) nickel aluminide layer, 0.02 mm thick, acting as a bonding layer, is provided. Finally, the bearing body 1 comprises connections such as 9 for the resistance branching.

The monolithic unit acting as a bearing is machined and rectified on its outside diameter (94 mm) to the required tolerances, like a mechanical part made from only one material.

Of course, other embodiments of the invention may be contemplated. Thus, the various material layers can be laid on the concave surface of a hollow cylinder.

Throughout the claims the expression "sprayed" shall mean by chemical flame or by plasma torch.

I claim:

1. A monolithic stator member for rollers used for the thermal treatment of longitudinal structures, such as continuous filaments, yarns, slivers, rovings, etc., said member simultaneously acting as a heating organ and a bearing for the roller rotor, and comprising the following elements:

a cylindrical metallic support, a first layer of mineral electrical insulator, sprayed on the support, an electrical heating resistance, coiled around the first layer of mineral electrical insulator, electrical connections for the resistance, a layer of thermal insulator sprayed between the metallic support and the first layer of mineral electrical insulator, a second layer of mineral electrical insulator, sprayed covering the first layer of mineral electrical insulator and in which the electrical resistance is embedded and a sprayed on friction layer, said layers being concentric to and overlying the full cylindrical surface of said support for that length of it which is adapted to underlie the rotor.

2. A stator member according to claim 1, in which each layer of mineral electrical insulator is 0.2 to 2 mm thick and the friction layer is 0.05 to 0.5 mm thick.

3. A stator member according to claim 1, in which between the second layer of mineral electrical insulator and the friction layer, there is a sprayed cermet layer, of which the thickness is proportional to roller dimensions, and the thermal conductivity and expansion coefficient are close to those of the metallic support.

4. A stator member according to claim 1, in which the mineral electrical insulator is made from a material of the group consisting of aluminium oxide, zirconium oxide, magnesium aluminate, aluminium silicate.

5. A stator member according claim 3, in which the cermet is made from pseudo alloys of a metal and a refractory material of the group consisting of aluminium oxide and aluminium, aluminium oxide and nickel, aluminium oxide and chromium, aluminium oxide and molybdenum, and zirconium oxide and chromium.

6. A stator member according to claim 3, in which the metallic support is made from steel and the cermet is made from a mixture of 25 percent aluminium and 75 percent alumina.

7. A stator member according to claim 1, in which the layer of thermal insulator, is made from materials of the group consisting of zirconium and soda zirconate.

8. A stator member according to claim 1, in which the friction layer is made from materials of the group consisting of bronze, molybdenum, and chromium oxide.

9. A stator member according to claim 1, in which bonding layers, about 0.05 mm thick, are sprayed between the different material layers.

10. A stator member according to claim 9, in which the bonding layers are made from materials of the group consisting of nickel aluminide and molybdenum.

* * * * *